United States Patent Office

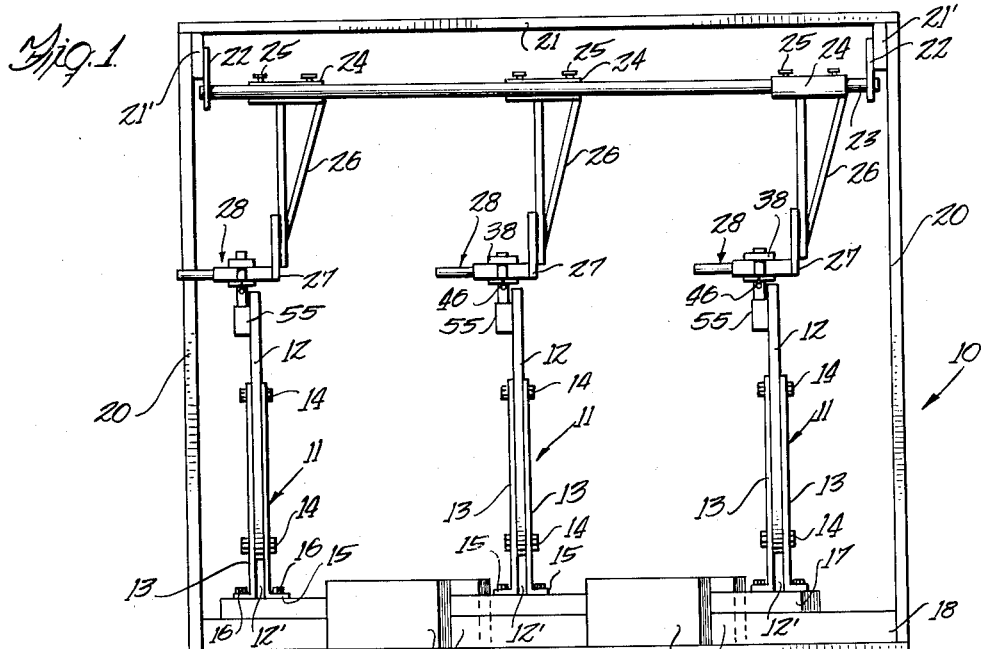
Fig. 1.
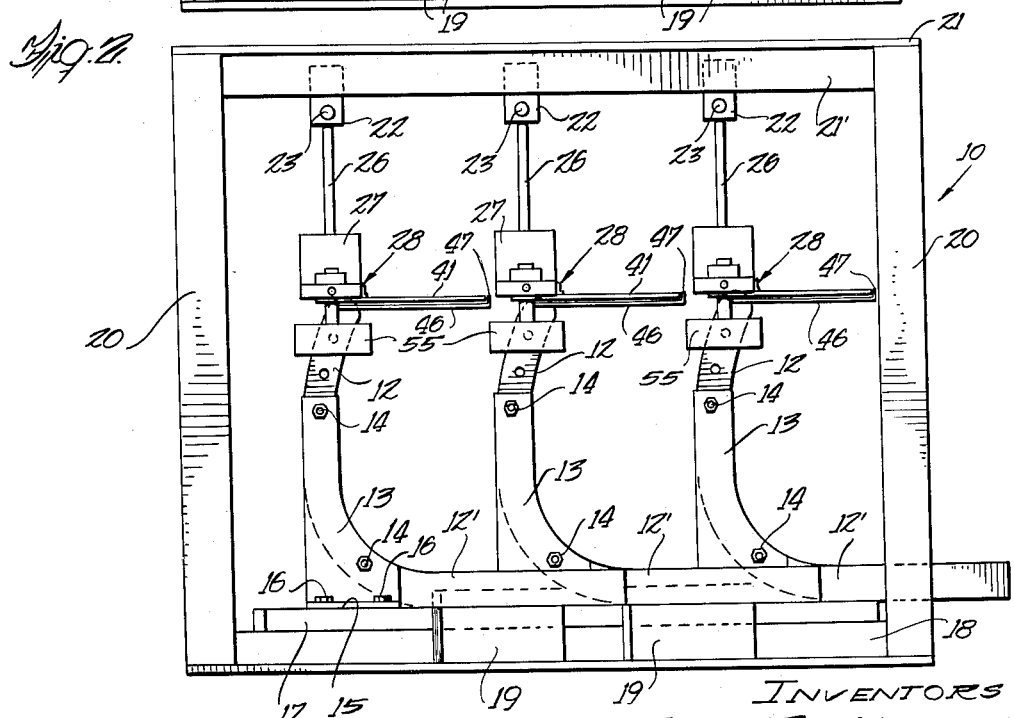
Fig. II.
INVENTORS
FRED W. BARBKNECHT
JOHN S. SVITORIS
Paul O. Pippel
ATTORNEY

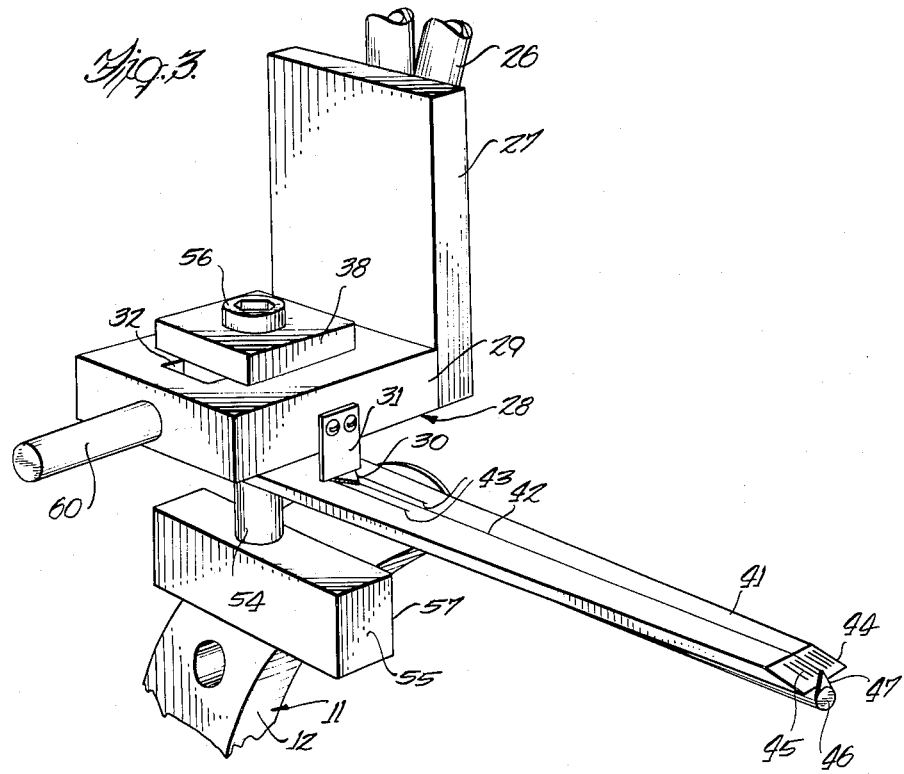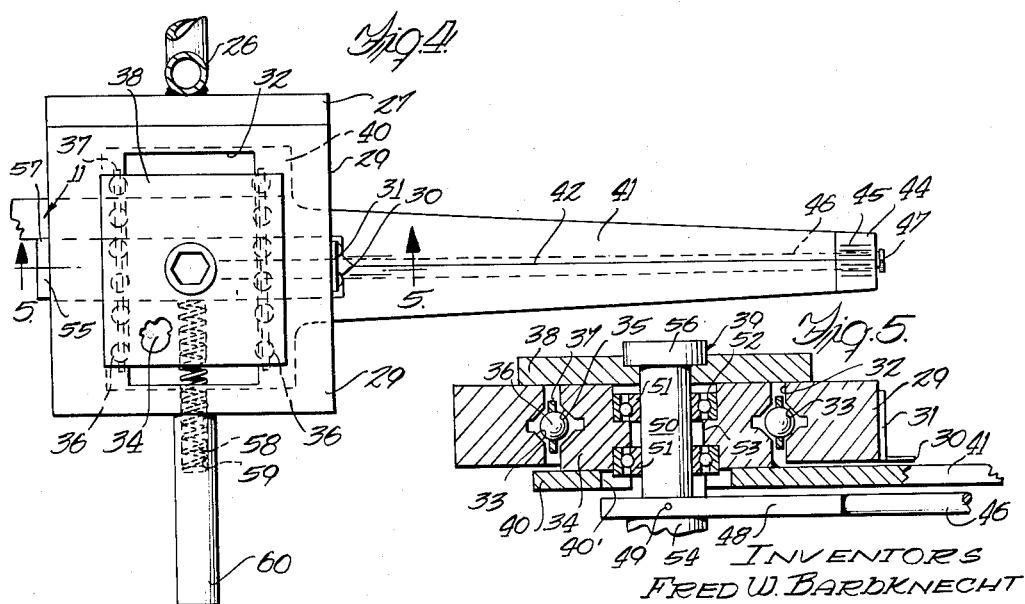

3,126,643
Patented Mar. 31, 1964

3,126,643
PLOW BEAM LOCATING AND ALIGNMENT GAGE
Fred W. Barbknecht, Palos Heights, and John S. Svitoris, New Lenox, Ill., assignors to International Harvester Company, Chicago, Ill., a corporation of New Jersey
Filed Dec. 19, 1960, Ser. No. 76,904
4 Claims. (Cl. 33—180)

This invention relates to a locating device for assembling plow beams. More specifically, the invention relates to a gage for fixing the location of plow beams in position for assembly with a supporting frame member.

In the conventional two, three, or four share plows, the plow shares are laterally spaced and are secured to plow beams which are in turn secured to a supporting frame member which is positioned in diagonal relation with respect to a plow frame so that during operation the plows are positioned in relatively longitudinally spaced relation. In other words, the plows are spaced horizontally with respect to each other and are also spaced longitudinally with respect to each other along the line of movement of the plow structure. In the manufacture and assembly of the plow structures, the diagonally extending frame member to which the plow beams are to be secured, is placed in a holding fixture. The diagonal supporting frame of the plow has been suitably predrilled for the receipt of bolts which fasten the plow beams, but the bolts are usually of somewhat smaller diameter than the drilled holes so that the beams may be adjusted to some extent laterally and also may be adjusted so that the sides of the plow beams are all in parallel relation. In the conventional assembly, the operator would assemble the plow beams to the diagonal frame member and with the utilization of a measuring scale would attempt to determine the exact position so that upon tightening of the bolts the plow beams would be exactly spaced and with their sides parallel to each other. This method of assembling the plow beams to the diagonal member has been time-consuming and, in many instances, results in inaccurate spacing with the plow beams out of parallel with respect to each other.

It is therefore a prime object of this invention to provide an improved gage and alignment device which is utilized to rapidly determine the exact location for the plow beams during assembly and to assure the parallel relation of the sides of the plow beams with respect to each other.

Still another object of this invention is to provide an improved and simplified alignment gage for accurately locating the position of a plow beam relative to its supporting frame member and to assure that the sides of the plow beam are parallel with respect to other plow beams similarly located.

A still further object is to provide an improved alignment gage for aligning the spacing and parallelism of plow beams, the said gage being operative in assembly operations and including indicating means which quickly reveal to the operator any inaccuracies of the plow beam relative to the plow beam spacing and the parallelism of the sides of the plow beam.

A more specific object of the invention is to provide an improved plow beam locating gage including a spacing indicator which is engageable with the side of a plow beam for indicating the proper position of the plow beam with respect to other beams similarly located and which also includes means engageable with the sides of the plow beam for indicating whether or not the plow beam is in parallel relation with respect to other plow beams similarly assembled.

These and other objects of the invention will become apparent from a reading of the specification when examined in connection with the accompanying sheets of drawings.

In the drawings:

FIGURE 1 is a front view, in elevation, of a plow beam locating device and fixture for locating a plurality of plow beams on a supporting frame;

FIGURE 2 is a side-elevational view of the locating device and fixture shown in FIGURE 1;

FIGURE 3 is a perspective view of an improved locating gage for locating plow beams;

FIGURE 4 is a plan view of the locating gage shown in FIGURE 3; and

FIGURE 5 is a cross-sectional view through a locating gage taken substantially along the line 5—5 of FIGURE 4.

Referring now particularly to FIGURES 1 and 2, a locating device for locating plow beams is generally designated by the reference character 10. The locating device 10 is adapted to position and locate a plurality of plow beams generally designated at 11. Each plow beam comprises a curved upright plate 12 integrally formed with a forwardly and horizontal extending top section 12'. The plates 12 of the plow beams 11 are shown in inverted position for purposes of assembly. In the finished assembled position of the plows for operation, the plows are connected to the upper drilled ends of the plates 12 and the structure is inverted from the position shown in FIGURES 1 and 2. The curved upright plates 12 are disposed between and connected to laterally spaced brackets 13 suitably connected by means of bolt and nut connections 14. Each of the plates 13 includes a horizontally extending flange 15 which by means of bolts 16 is rigidly connected to a horizontal and diagonally extending supporting beam 17. The supporting beam 17 forms part of a frame structure of the completed plow, the said frame structure not being shown in the present disclosure.

The locating device 10, as shown in FIGURES 1 and 2, further comprises a base 18 on which are supported cradles in the form of upright supports 19 suitably connected to the base 18, the said supports 19 cradling and maintaining the supporting beam 17 in position for assembly. The base 18 has connected thereto four upright supports 20 connected at their upper end to a top panel 21. A pair of horizontally extending beams 21' are supported on the panel 21 and also are suitably connected to the supports 20. A plurality of brackets 22, as best shown in FIGURE 2, are connected to the beams 21' and project downwardly with respect thereto. As shown in FIGURE 1, the brackets 22 are disposed in pairs and each pair of brackets 22 support a rod 23 which is pivotally connected to the brackets 22. Each rod 23 has positioned thereon a tubular sleeve 24 which is rigidly secured to each rod 23 by means of set-screws 25 to pivot therewith. Each of the tubular sleeves 24 has connected thereto a triangular frame 26 of tubular construction. Each triangular frame 26 is provided at its lower end with an upright plate 27 supporting a gage generally designated at 28 and best shown in FIGURES 3, 4, and 5.

As shown in FIGURES 3 through 5, each gage comprises a gage block 29 suitably secured to the plate 27 and extending horizontally with respect thereto. Each gage block on an outer side thereof is provided with an indicating pointer 30 suitably connected to the side of the block 29 by means of a bracket 31. Each gage block 29 also includes a transversely extending recess 32 having horizontally spaced inner side walls provided with V-shaped grooves or tracks designated at 33. A gaging element in the form of a block 34 disposed in the recess 32 also has side walls provided with horizontally spaced V-shaped grooves or tracks 35 complementing the tracks 33. Ball bearings 36 are adapted to roll in the grooves 33, 35, and are retained therein by means of retainer strips 37. A top plate 38 is supported upon the gaging element 34, the said plate being provided with a central annular recess 39. A bottom plate 40 is provided with an opening 40' and is suitably connected to the gaging element 34 to move therewith within the recess 32. An arm 41 is integrally formed with the plate 40 and it projects longitudinally and horizontally in the direction of normal movement of an assembled plow in the operation of plowing. The arm 41 is provided with an indicating line 42 and is also provided with a pair of shortened tolerance lines 43 in the vicinity of the indicating pointer 30. The forward end of the arm 41 is also provided with a tapered end 44 having a plurality of gaging indications or lines indicating parallelism and being designated at 45.

It can be seen that the gaging element 34 thus can move in a direction transverse with respect to the pointer 30 within the recess 32, the arm 41 extends in effect horizontally and perpendicular with respect to the line of movement of the gage member, which as indicated moves in a transverse direction with respect to the pointer 30. A plane perpendicular to the horizontal frame member 17, the said plane being disposed exactly coincident with the pointer end 30 would be considered the perfect parallel plane to which the sides of the plow beams must conform in order to be properly parallel. The gage element 34 thus moves laterally or transversely with respect to said plane and when the line 42 coincides with the pointed end of the indicator 30, the proper position for location of the plow beam is determined as will presently be more explicitly described.

A parallelism indicating finger 46 extends horizontally with the arm 41 and is suitably provided with an indicating arrow 47 adapted to register with the markings 45. The rod or finger 46 is suitably connected to a bracket 48 which is secured by means of a pin 49 to a shaft 50 which extends upwardly through the recess 39. A pair of ball bearings 51 are supported in a bore 52 provided in the element 34, the said bearings 51 being supported and separated by means of shoulders 53 within the bore 52. The shaft 50 is provided with an extension 54 of larger diameter than the shaft 50, the said extension 54 as shown in FIGURE 3 being connected to a parallel block 55. The shaft 50 is adapted to rotate on the bearings 51 and is secured to the gage element 34 by means of a set-screw of socket-head construction and designated at 56. The parallel block 55 includes an engaging face 57.

The operation of each gage 28 is the same, though three gages 28 are disclosed. The three-gage construction disclosed permits the assembly of three laterally spaced plow beams to the supporting member 17 so that a three-gang plow may be constructed. It is, of course, obvious that additional gaging elements or less may be utilized depending on the number of plows desired in the final structure. The diagonal horizontal frame member 17 is placed in position in the space blocks 19 and the first plow beam, which is the one on the right-hand side in FIGURE 2, may now be assembled. The plow beam is moved laterally toward the gage 28 and particularly with respect to the parallelism block 55 until the side of the plow beam engages the face 57 of the block 55. The block 55 and the gaging element 34 are urged normally in the direction toward the upright plate 27 by means of a spring 58 disposed in a bore 59 of a rod 60 as best shown in FIGURE 4. The plow beam is further moved against the block 55 whereupon, as shown in FIGURE 3, the arm 41 is moved until the line 42 coincides with the pointed element 30 whereupon the proper position for the plow beam is now established. However, it is still necessary to be completely assured that the side of the plow beam is exactly parallel with respect to the vertical plane which is perpendicular to the support 17 and which coincides with the pointed indicator 30. The block 55 is free to rotate on the shaft 54 and any rotative movement about the vertical axis of the shaft 54 is, of course, immediately reflected in the rotation of the parallelism finger or rod 46 whereupon the pointer 47 does not register or align with the line 42 on the end of the arm 41. Thus if the side of the plow beam being assembled is not in parallel with respect to the aforementioned plane, it is quickly noted by the operator since the pointer 47 is disposed away from the line 42. He thus adjusts the plow beam until the pointer 47 is exactly in registry with the line 42 on the arm 41 and he is now assured that the plow beam side is parallel with respect to the desired vertical plane. Thus now, if the pointer 30 is in registry with the line 42 and the arrow 47 is also in registry with the line 42, the assembler is assured that the exact position has been achieved, and he then will simply secure the bolts 16 into the frame member 17 through the holes previously drilled. As above indicated, the holes are sufficiently enlarged so as to permit the slight movement of the plow beam so that it may be adjusted with respect to the desired spacing and desired parallelism. The bolts are then tightened in a manner which will guarantee that the position is maintained.

The operator now has one plow beam properly positioned and he then positions the others in the same manner by the utilization of the gages. Since the gages are all accurately machined and securely positioned on an accurate fixture, proper spacing and complete parallelism of the sides of the plow beams is assured. Thus, it is no longer necessary to try to achieve accuracy by means of haphazard scale measurements and other similar devices. Since the frames 26 are pivotal on the rods 23, any one of the gages 28 may be swung to an out of the way position if less than three plow beams are to be positioned.

Accuracy by the utilization of the locating device is completely assured and the speed of operation of the assembly of the plow beams is greatly enhanced. Thus, it is believed obvious that an improved plow beam locating device has been disclosed and that the objects of the invention have been fully achieved. It must be understood that changes and modifications may be made without departing from the spirit of the invention as disclosed or from the scope thereof as defined in the appended claims.

What is claimed is:

1. A locating device for the assembly of a plurality of normally vertical plow beams to a normally horizontal support so that said plow beams are equally spaced transversely, each plow beam having at least one vertical flat side and the said sides of said assembled beams are located relatively in parallel planes with respect to each other comprising; a support, a plurality of vertical frames hingedly suspended from said support, said frames being relatively transversely spaced, a gage supported on each frame and positioned above said horizontal support, each gage comprising a gage block connected to said frame and extending laterally with respect thereto, an indicating element on said gage block, said gage block having a recess, a movable gaging element disposed in said recess and being slidable transversely with respect to said indicating element, an elongated arm connected to said gaging element and extending horizontally and perpendicular to the direction of movement of said gaging element, said arm having spacing indicating means adapted to be placed in registry with the indicating element during transverse movement of said gaging element, parallelism indicating means on said arm, a parallelism indicator including an elongated finger extending substantially longitudinally with said arm, means pivotally connecting said finger for pivotal movement about a vertical axis to said gaging element, whereby said finger may be swung in a horizontal plane, said last means including a shaft, a parallel block connected to said shaft and being pivotal therewith, said parallel block having a vertical face adapted to engage a flat side of a plow beam to be located on a horizontal support, and biasing means connected to said gaging element for normally urging said vertical face against said plow beam side, and whereupon when said spacing indicating means is in registry with said indicating element each plow beam is properly relatively spaced, and an indicating means on said finger, the horizontal position of said indicating means on said finger being determined by the position of the face of said parallelism block when engaging the flat side of the plow beam, whereby when said indicating means on said finger registers with said parallelism indicating means, said plow beam sides are in correct vertical and relative parallel planes.

2. A locating device for the assembly of a plurality of normally vertical plow beams to a normally horizontal support so that said plow beams are equally spaced transversely, each plow beam having at least one flat vertical side and the said sides of said assembled beams are located relatively in parallel planes with respect to each other comprising; a support, a plurality of vertical frames hingedly suspended from said support, said frames being relatively transversely spaced, a gage supported on each frame above said horizontal support, each gage comprising a gage block connected to said frame and extending laterally with respect thereto, an indicating element on said gage block, a movable gaging element supported on said gage block and being slidable transversely with respect to said indicating element, an elongated arm connected to said gaging element and extending horizontally and perpendicular ot the direction of movement of said gaging element, said arm having spacing indicating means adapted to be placed in registry with the indicating element during transverse movement of said gaging element, parallelism indicating means on said arm, a parallelism indicator including an elongated finger extending substantially longitudinally with said arm, means pivotally connecting said finger for pivotal movement about a vertical axis to said gaging element, whereby said finger may be swung in a horizontal plane, said last means including a shaft, a parallel block connected to said shaft and being pivotal therewith, said parallel block having a vertical face adapted to engage the flat side of a plow beam to be located on a horizontal support, and biasing means connected to said gaging elements for normally urging said vertical face against said plow beam side, and whereupon when said spacing indicating means is in registry with said indicating element each plow beam is properly relatively spaced, and an indicating means on said finger, the horizontal position of said indicating means on said finger being determined by the position of the face of said parallelism block when engaging said flat side of said plow beam, whereby when said indicating means on said finger registers with said parallelism indicating means, said blow beam sides are in correct vertical and relative parallel planes.

3. A locating device for the assembly of a plurality of normally vertical plow beams to a normally horizontal support so that said plow beams are equally spaced transversely, each plow beam having at least one vertical flat side and the said sides of said assembled beams are located relatively in parallel planes with respect to each other comprising; a support, a plurality of vertical frames hingedly suspended from said support, said frames being relatively transversely spaced, a gage supported on each frame and positioned above said horizontal support, each gage comprising a gage block connected to said frame and extending laterally with respect thereto, an indicating element on said gage block, a movable gaging element supported on said gage block and being slidable transversely with respect to said indicating element, an elongated arm connected to said gaging element and extending horizontally and perpendicular to the direction of movement of said gaging element, said arm having spacing indicating means adapted to be placed in registry with the indicating element during transverse movement of said gaging element, parallelism indicating means on said arm, a parallelism indicator including an elongated pointer extending substantially longitudinally with said arm, means pivotally connecting said pointer for pivotal movement about a vertical axis to said gaging element, whereby said pointer may be swung in a horizontal plane, said last means including a shaft, a parallel block connected to said shaft and being pivotal therewith, said parallel block having a vertical face adapted to engage a side of a plow beam to be located on a horizontal support, and biasing means connected to said gaging element for normally urging said vertical face against said flat plow beam side, and whereupon when said spacing indicating means is in registry with said indicating element each plow beam is properly relatively spaced, the horizontal position of said pointer being determined by the position of the face of said parallelism block in engagement with the flat side of said plow beam, whereby when said indicating means on said pointer registers with said parallelism indicating means, said plow beam sides are in correct vertical and relative parallel planes.

4. A locating device for locating a flat-sided upright member relative to a horizontal member prior to the interconnection of said members, comprising a gage fixedly supported above said horizontal member, said gage including a gage support having an indicating element denoting the proper position of said upright member with respect to a vertical plane perpendicular to said horizontal member, a movable gage member on said gage support and being adapted to be moved horizontally and transversely relative to said indicating element, a parallelism block on said gage member, said block having a flat side, said block being movable with said gage member against a flat side of said upright member, means biasing said gage member transversely to move the flat side of said block into engagement with a flat side of said upright member, an indicator arm associated with said block and extending horizontally and perpendicular with respect to the line of movement of said gage member and including means registering with said indicating element at one position of said gage member, parallelism indicating means on said arm, means pivotally connecting said block to said gage member about a vertical axis whereby the face of said block may be pivoted in and out of parallel with respect to said vertical plane, and a parallelism pointer associated with said block and pivotal therewith for swinging movement in a horizontal plane, and adapted to register with said parallelism indicating means when said face of said block and flat side of said upright member are parallel with said vertical plane.

References Cited in the file of this patent

UNITED STATES PATENTS 2,367,004    Chitwood _____ Jan. 9, 1945